United States Patent [19]
Craig

[11] Patent Number: 5,253,676
[45] Date of Patent: Oct. 19, 1993

[54] LOW BERNOULLI FORCE CONTROL ORIFICE

[75] Inventor: Evan L. Craig, Chaffee, N.Y.

[73] Assignee: Moog Controls, Inc., East Aurora, N.Y.

[21] Appl. No.: 930,317

[22] Filed: Aug. 13, 1992

[51] Int. Cl.$^5$ .................................. F15B 13/043
[52] U.S. Cl. .................................... 137/625.61
[58] Field of Search ................ 137/82, 625.61, 625.64

[56] References Cited

U.S. PATENT DOCUMENTS

| | | | |
|---|---|---|---|
| 3,910,314 | 10/1975 | Nicholson | 137/625.64 X |
| 4,596,271 | 6/1986 | Brundage | 137/625.64 X |
| 4,676,273 | 6/1987 | Stoltman | 137/625.61 |
| 4,966,195 | 10/1990 | McCabe | 137/625.61 |

Primary Examiner—Gerald A. Michalsky
Attorney, Agent, or Firm—Wall and Roehrig

[57] ABSTRACT

A controlled orifice for a hydraulic pressure control valve has a plunger and a conic orifice seat. The plunger has a head which forms a stagnation zone, and a rim with surfaces that define a sharp edge, these surfaces making an angle of at least 30 degrees with the conic bore orifice seat. A conic back surface extends to the plunger stem. The sharp edge of the rim forms a small annular *vena contracta* so that the regions where rapid flow is experienced are kept as small as possible. This reduces undesirable Bernoulli forces.

6 Claims, 1 Drawing Sheet

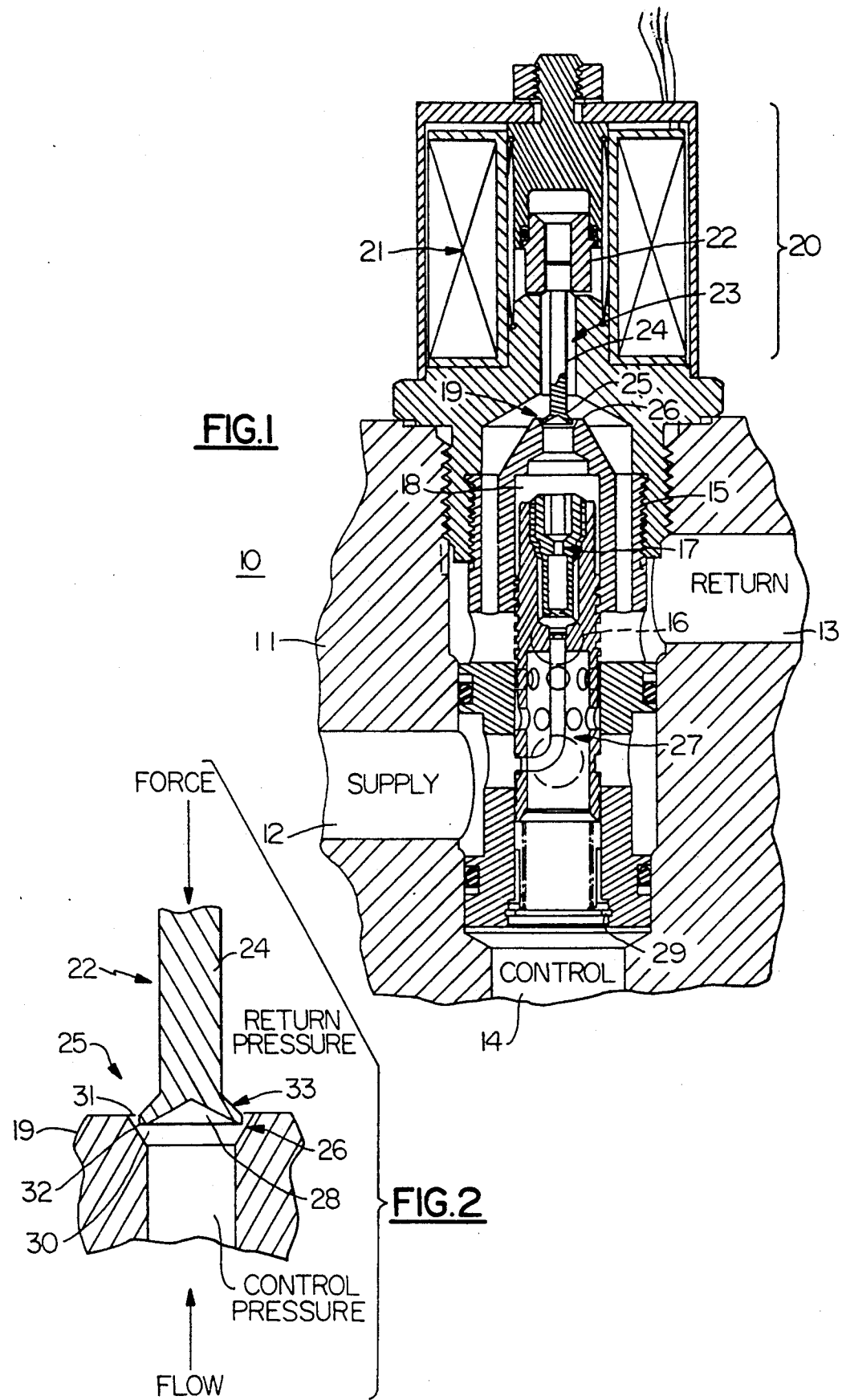

LOW BERNOULLI FORCE CONTROL ORIFICE

BACKGROUND OF THE INVENTION

This invention relates to hydraulic pressure control devices which generate a control pressure. The invention is specifically concerned with a hydraulic pressure control orifice of the type in which a solenoid moves a plunger with respect to an orifice seat to define a controlled restriction.

Hydraulic pressure control valves commonly use a hydraulic half bridge to generate a control pressure. The half bridge consists of two flow restrictions placed in series between a high pressure source and a low pressure sink, generating an intermediate control pressure in between. Typically, a plunger over an orifice is used as the second restriction, to generate an equilibrium between the control pressure and an input force. The control pressure multiplied by the area of the plunger (or orifice) equals the force generated in opposition to the input force. Equilibrium is maintained by allowing the plunger to move with respect to the orifice. Thus, an increase in input force causes the orifice to close, increasing the restriction, and increasing the control pressure. A decrease in input force allows the control pressure force to overcome the input force, allowing the plunger to move away from the orifice, reducing the control pressure. Likewise, an increase in control pressure, caused by a change in the load, causes the plunger to move away from the orifice to reduce the control pressure back to the equilibrium pressure. Similarly, a decrease in control pressure allows the input force to overcome to the force generated by pressure, close the plunger toward the orifice, and increase the control pressure back toward equilibrium.

The pressure control plunger and orifice, as described, performs two functions: It generates a force proportional to the control pressure, and it allows flow to pass (to maintain that pressure in the half bridge). Ideally, these two functions do not interact. In reality, the flow passing the plunger generates pressures which act on several regions of the typical plunger. Some of the resulting forces are desirable, some not. The plunger and orifice together form an annular *vena contracta*. Fluid approaching the orifice at low axial velocity produces a stagnation pressure on the front of the plunger substantially equal to the control pressure. This is the desired effect. Near the annulus, the flow accelerates as it approaches, and decelerates as it departs behind the *vena contracta*. The deceleration is caused by an adverse pressure gradient. The adverse pressure gradient of the downstream or diffuser part of the *vena contracta* can generate a low pressure at the throat of the *vena contracta*. This low pressure, acting on adjacent surfaces, generates forces known as "Bernoulli forces". These forces act perpendicular to the surface of the plunger, generating radial force on the sides of the plunger, and an axial force on the front of the plunger. These forces tend to draw the plunger off center, and also draw it forward toward the oncoming flow. These forces are undesirable. In addition, the decelerating flow can produce a force on the back of the plunger in the desired direction. However, the adverse pressure gradient can cause this flow to detach from the back of the plunger at various velocities, forming unsteady rotational flows and pressures. Therefore, these forces are also undesirable.

OBJECTS AND SUMMARY OF THE INVENTION

It is therefore an object of this invention to provide a control orifice which avoids the undesirable effects of Bernoulli forces, providing predictable and repeatable control pressures even under conditions of varying load.

It is another object to provide a control orifice of a simple but robust design.

In accordance with an aspect of this invention, the control orifice has plunger and orifice seat geometries that maximize the desirable forces, and minimize the unwanted forces. The front or proximal face of the plunger head is concave, allowing the flow to stagnate there in a small plenum, generating the desired stagnation pressure and force. The leading edge is made relatively sharp, and approaches the conical orifice at a steep angle, to minimize the area exposed to high velocity flow, and therefore also to minimize the forward force. A cylindrical outer edge portion of the plunger head is kept as short as possible, to minimize the radial outer edge area and Bernoulli force but still offer adequate mechanical support to the sharp leading edge. The back or distal side of the plunger draws sharply away from the flow stream, causing the flow to separate from the surface (at minimum flow velocities), eliminating accompanying unsteady forces. The conical orifice seat continues well past the edge of the plunger, encouraging the flow to remain attached there as it diffuses and returns to the sink pressure.

The above and other aspects, features, and advantages of this invention will become evident from the ensuing description of a preferred embodiment, to be read in conjunction with the accompanying Drawing.

BRIEF DESCRIPTION OF THE DRAWING:

FIG. 1 is sectional schematic view of a hydraulic valve according to a preferred embodiment of the invention.

FIG. 2 is a detail view showing the plunger and orifice seat of this embodiment.

DETAILED DESCRIPTION OF THE PREFERRED EMBODIMENT

With reference to the Drawing and initially to FIG. 1, a valve 10 has a valve body 11 formed as a bore having a supply manifold cavity 12, a return manifold cavity 13 and a control manifold cavity 14 connected to it. A cartridge valve 15 is fitted into the bore and has openings that communicate with the supply and return manifolds 12, 13. The latter are respectively coupled to a source of fluid pressure and to a return line leading to the fluid tank (not shown). Within the cartridge valve 15 is a valve spool 16 with its lower end (in this Figure) at the control manifold 14 and a calibrated orifice 17 at its opposite end. The orifice 17 feeds into a control pressure cavity 18, which in turn supplies fluid through a controlled orifice 19 to a channel that leads back to the return manifold 13. The spool 16 serves as a secondary stage with the half-bridge formed by the orifices 17 and 19 serving as a primary stage.

Atop the valve 10 is a control solenoid 20 with coils 21 and a movable core 22 which controls a plunger 23. The latter has an elongated axial stem 24 and a flange or head 25 that faces a generally conic seat 26, the seat 26 and head 25 defining the control pressure orifice 19.

In this case, a tube 27 in the spool brings fluid at supply pressure to the calibrated orifice 17.

The solenoid 20 produces a downward force proportional to the current supplied to its coils 21. The spool 16 is pressure balanced, so that the output control pressure (at its lower end) reaching the control manifold cavity 14 equals the pressure in the control pressure cavity 18 (at its upper end). When the control pressure above the spool 16 exceeds the pressure below it at the control manifold cavity 14, then the spool 16 descends, tending to restrict flow through the spool to the return manifold cavity 13, and opening flow from the supply manifold cavity 12. A spring 29 below the spool compensates for the minimum pressure available from the pressure control orifice 19, so that the valve 10 can generate lower pressures. In this case the seat 26 has a cone apex angle, i.e., included angle, of about 60 degrees, but can be shallower, i.e. up to 170 degrees, and is at least 15% greater in diameter than the head 25. The plunger head has a conic recess 28 at its lower or distal surface that faces the fluid flow. Here the recess has an apex angle of 120 degrees, but can be flat or convex, as long as the cavity formed between the seat and plunger is large enough to substantially stagnate the flow. There is an annular flat or radial rim 30 that meets a short cylindrical surface 31 to form a sharp radial edge 32 of the head 25. A conic upper or proximal surface 33 continues from the cylindrical surface 31 to the stem 24. The sharp edge 32 makes the zone of high velocity flow as small as possible.

In the described embodiment, the plunger head 25 has a diameter of 0.15 inches, and the axial length of the cylindrical surface 31 is 0.01 inch. The conic distal recess 28 has an apex angle of 120 degrees, and the proximal conic surface has an apex angle of 90 degrees. The conic seat 26 has an apex angle of 60 degrees.

The controlled orifice, 19 can find application in a hydraulic pressure control valve or in a general purpose control valve. The plunger may be driven by the solenoid 20 or by other suitable drive means.

As an alternative, the plunger can have an axial bore (not shown) in the stem 24. This facilitates manufacture, but does not affect operation.

The principal advantages of this pressure control valve arrangement arise from its geometry, which is tolerant of subtle variations. For example the distal face of the plunger head 25 can be convex or flat, rather than concave, so long as the rim of the head is capable of approaching the conical seat 26 surface at an angle of 30 degrees or greater.

The outer surface 31 need not be right cylinder, so long as it can define a sharp edge 32 that approaches the conic seat 26 at an angle of at least 30 degrees on each side. The proximal surface 33 of the plunger head 25 need not draw away from the conical seat 26 by more than 45 degrees.

The conical seat 26 extends to a diameter about 15 percent greater than the diameter of the head 25 at the edge 32. This feature self-centers the head 25, both in open and closed positions. Accordingly, the stem 24 of the plunger can be supported by a single linear bearing. Non-alignment problems are avoided without added friction.

While this invention has been described in detail with reference to a preferred embodiment, it should be appreciated that the invention is not limited precisely to that embodiment. Rather, many modifications and variations would present themselves to those skilled in the art without departing from the scope and spirit of this invention as defined in the appended claims.

What is claimed is:

1. Hydraulic pressure control valve providing an output control pressure that is proportional to a control signal level applied thereto; said valve having fluid pressure conduits respectively communicating with a fluid pressure source and a fluid return line, and a control pressure outlet; comprising a primary stage that includes a limiting restriction having an inlet coupled to said fluid pressure source a controlled orifice coupled to said return line, and a pressure control zone defined between said restriction and controlled orifice; said controlled orifice including a seat and a plunger urged against said seat and said plunger being coupled to a control device to which said control signal level is applied for urging said plunger relative to said seat, thus establishing a controlled flow between said seat and said plunger; and a secondary stage coupled to said control zone, said pressure source, and said return line for delivering fluid at a controlled pressure at said control pressure outlet in response to the pressure at said control zone;

wherein said seat has a conical surface facing said plunger; and said plunger has a stem coupled to said control device, and a distal head facing said seat conical surface, said plunger head having a distal face with a concave central portion, a transverse distal face, meeting at a sharp corner a generally cylindrical surface extending proximally from said distal face and a conic proximal surface extending from said cylindrical surface to said stem.

2. Hydraulic pressure control valve according to claim 1 wherein said seat has a concave conic surface having an apex angle of 170 degrees or less.

3. Hydraulic pressure control valve according to claim 2 wherein said conic surface has an apex angle of substantially 60 degrees.

4. Hydraulic pressure control valve according to claim 1 wherein said conic proximal surface has an apex angle on the order of about 90 degrees.

5. Hydraulic pressure control valve according to claim 1 wherein said distal face and cylindrical surface define an annular edge of substantially 90 degrees.

6. Hydraulic pressure control valve according to claim 1 wherein said plunger head has a concave conic distal face with an apex angle on the order of about 120 degrees.

* * * * *